US008909574B2

(12) United States Patent
Mohammadi et al.

(10) Patent No.: US 8,909,574 B2
(45) Date of Patent: Dec. 9, 2014

(54) SYSTEMS FOR MATCHING SPARKLE APPEARANCE OF COATINGS

(71) Applicant: Axalta Coating Systems IP Co., LLC, Wilmington, DE (US)

(72) Inventors: Mahnaz Mohammadi, Moorestown, NJ (US); Larry Eugene Steenhoek, Wilmington, DE (US)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 0 days.

(21) Appl. No.: 14/132,389

(22) Filed: Dec. 18, 2013

(65) Prior Publication Data

US 2014/0195468 A1 Jul. 10, 2014

Related U.S. Application Data

(63) Continuation of application No. PCT/US2012/042703, filed on Jun. 15, 2012.

(60) Provisional application No. 61/498,748, filed on Jun. 20, 2011, provisional application No. 61/498,756, filed on Jun. 20, 2011.

(51) Int. Cl.
*G06F 15/18* (2006.01)
*G06N 3/02* (2006.01)

(52) U.S. Cl.
CPC ........................................ *G06N 3/02* (2013.01)
USPC ............................................................ 706/21

(58) Field of Classification Search
CPC .................................... G06N 3/02; G01J 3/463
See application file for complete search history.

(56) References Cited

U.S. PATENT DOCUMENTS

| 6,507,803 | B1 | 1/2003 | Eickmeyer et al. | |
|---|---|---|---|---|
| 6,714,924 | B1 | 3/2004 | McClanahan | |
| 6,852,265 | B2 | 2/2005 | Olaru et al. | |
| 6,952,265 | B2 | 10/2005 | Prakash et al. | |
| 2002/0106121 | A1* | 8/2002 | McClanahan | 382/156 |
| 2008/0010027 | A1 | 1/2008 | Alman | |
| 2009/0019086 | A1 | 1/2009 | Prakash et al. | |
| 2009/0157212 | A1 | 6/2009 | McClanahan et al. | |
| 2010/0033721 | A1* | 2/2010 | Lee et al. | 356/421 |

FOREIGN PATENT DOCUMENTS

WO 2008103405 A1 8/2008

OTHER PUBLICATIONS

ISA Korean Intellectual Property Office, International Search Report for Application No. PCT/US2012/042703, mailed Jan. 7, 2013.
ISA Korean Intellectual Property Office, International Preliminary Report on Patentability for Application No. PCT/US2012/042703, mailed Jan. 9, 2014.

* cited by examiner

*Primary Examiner* — Li-Wu Chang
(74) *Attorney, Agent, or Firm* — Ingrassia Fisher & Lorenz, P.C.

(57) ABSTRACT

This disclosure is directed to a process for producing one or more predicted target sparkle values of a target coating composition. An artificial neural network can be used in the process. The process disclosed herein can be used for color and appearance matching in the coating industry including vehicle original equipment manufacturing (OEM) coatings and refinish coatings. A system for producing one or more predicted target sparkle values of a target coating composition is also disclosed.

12 Claims, 7 Drawing Sheets

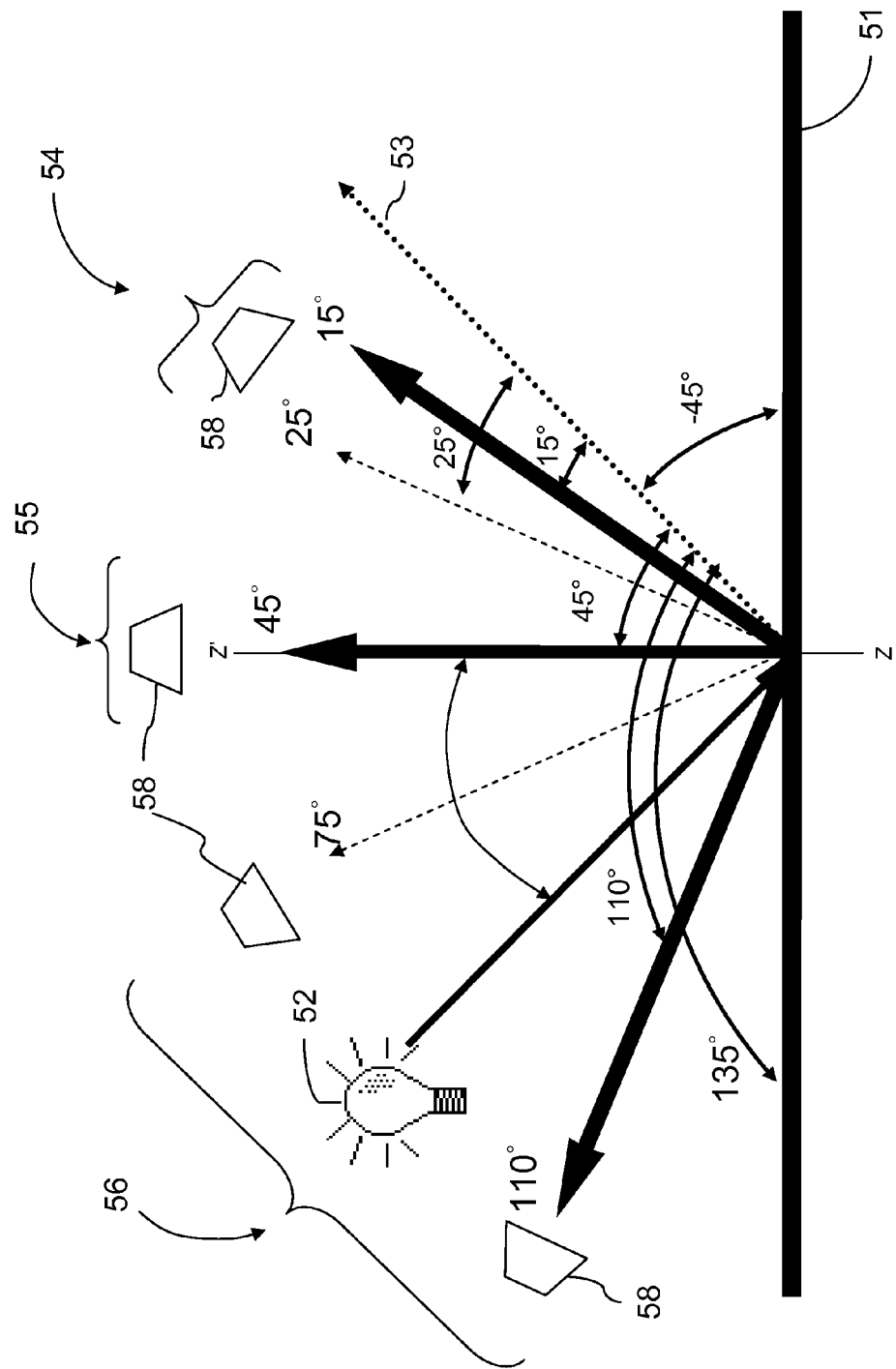

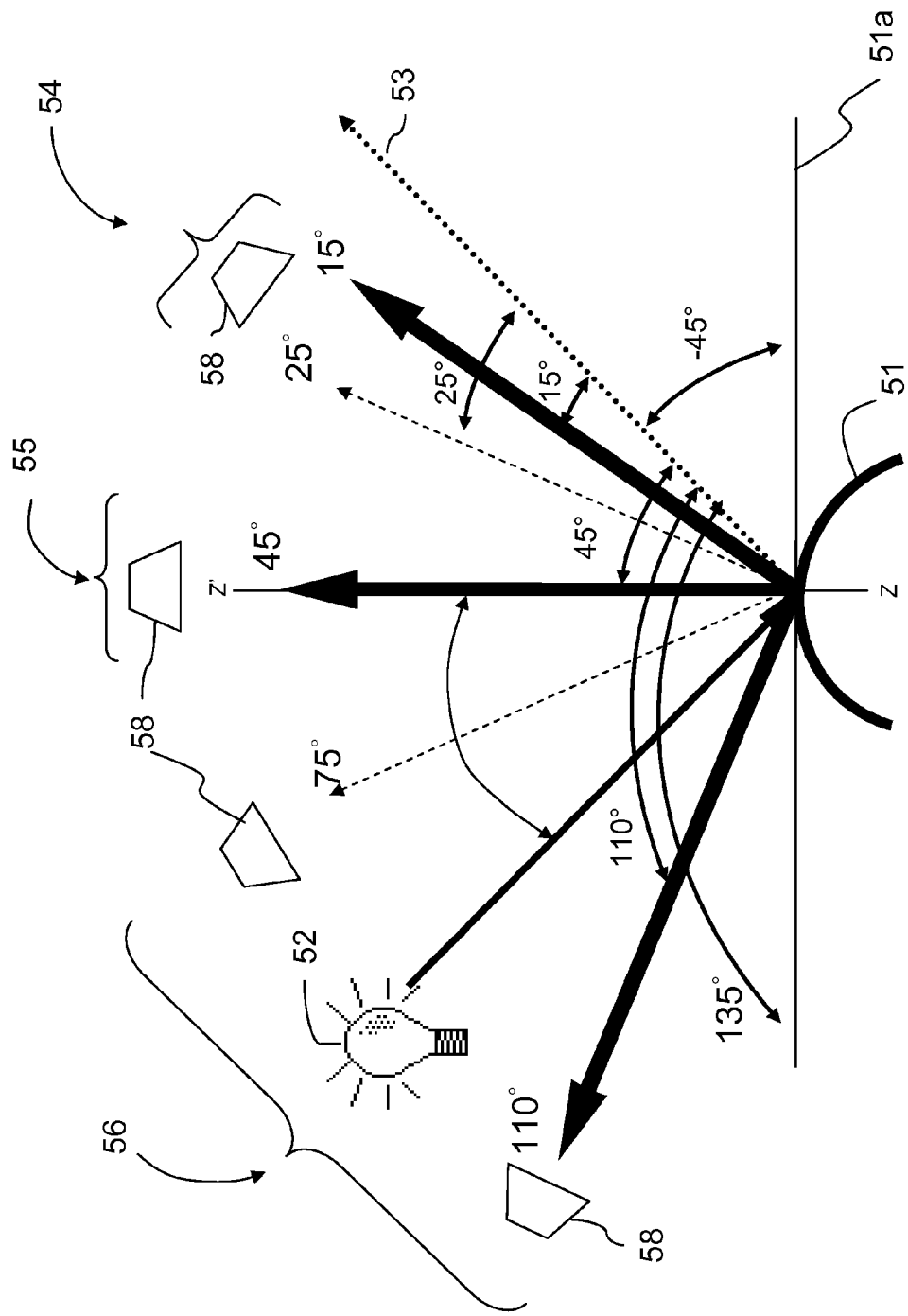

US 8,909,574 B2

SYSTEMS FOR MATCHING SPARKLE APPEARANCE OF COATINGS

CROSS-REFERENCE TO RELATED APPLICATION

This application is a continuation of International Application No. PCT/US2012/042703, filed Jun. 15, 2012 which was published under PCT Article 21(2) and which claims priority to U.S. Application No. 61/498,748, filed Jun. 20, 2011, and to U.S. Application No. 61/498,756, filed Jun. 20, 2011, which are all hereby incorporated in their entirety by reference.

TECHNICAL FIELD

This disclosure is directed to a process for producing one or more predicted target sparkle values of a target coating composition and for matching sparkle appearance of coatings. The disclosure is also directed to a system for producing one or more predicted target sparkle values of the target coating composition.

BACKGROUND

Surface coatings containing effect pigments, such as light absorbing pigments, light scattering pigments, light interference pigments, and light reflecting pigments are commonly used. Flakes, such as metallic flakes, for example aluminum flakes, are examples of such effect pigments and are especially favored for the protection and decoration of automobile bodies, such as for example by reason of their imparting a differential light reflection effect, usually referred, to as "flop", as well as flake appearance effects, which include flake size distribution and the sparkle imparted by the flake as well as the enhancement of depth perception in the coating. The flake containing coatings usually also contain other pigments or colorants, generally of a light absorbing rather than a light scattering type. These light absorbing pigments interact with effect pigments such as flakes to change the appearance effect of the coating. In general, visual coating appearance includes texture, sparkle, glitter or other visual effects of a coating. The visual appearance can vary when viewed from varying viewing angles, with varying illumination angles, or with varying illumination intensities.

For repairing a previously coated substrate, for example, of an automotive body, it is necessary to choose the correct colorants or colorant combinations to match the color of that coated substrate as well as the correct effect pigments such as metallic flakes to match the color and appearance of that coated substrate. Developments have been made to select colorants based on color measurement of a target coating. Selection of effect pigments, such as flakes, however, is traditionally done manually by an experienced shader, based on their expertise. Once the flakes have been selected, the flakes are added into a formulation algorithm producing one or more preliminary matching formulas. One or more test coatings are then prepared based on the preliminary matching formulas and sprayed on test panels, which are then visually compared to the target coating. If the appearance such as flop and/or sparkle match are deemed unsatisfactory, the shader adjusts the type and/or changes the amount of the flakes entered into the algorithm to get new color/flop matching formulas and the whole cycle is repeated until an adequate match is achieved in both color and appearance at all angles of illumination and viewing. This traditional approach, however, requires repeated spraying and visually comparing test panels with the target coating.

A need exists, therefore, for a method for matching closely both the color and appearance of the target coating. In addition, other objects, desirable features and characteristics will become apparent from the subsequent summary and detailed description, and the appended claims, taken in conjunction with the accompanying drawings and this background.

SUMMARY

This invention is directed to a process for producing one or more predicted target sparkle values of a target coating composition, said process comprising the steps of:

(A) obtaining training data of a plurality of training coatings, said training data comprise measured color characteristics, measured sparkle values and an individual training coating formulation associated with each of the training coatings; and (B) training an artificial neural network with said training data to produce a trained artificial neural network that is capable of producing a predicted sparkle value based on a coating formulation and color characteristics associated with said coating formulation, wherein said trained artificial neural network is trained based on said measured color characteristics, said measured sparkle values and said individual training coating formulation associated with each of the training coatings.

BRIEF DESCRIPTION OF DRAWINGS

The present invention will hereinafter be described in conjunction with the following drawing figures, wherein like numerals denote like elements, and:

FIGS. 3A and 3B show examples of various illumination angles and viewing angles;

FIG. 5A is a sketch representing a probability plot of error of $S_G$ prediction (solid circle: training data; open square: testing data). FIG. 5B is a sketch representing predicted $S_G$ (open square) and measured $S_G$ (solid circle); FIG. 6A is a sketch representing a probability plot of error of $S_G$ prediction (solid circle: training data; open square: testing data). FIG. 6B is a sketch representing predicted $S_G$ (open square) and measured $S_G$ (solid circle).

DETAILED DESCRIPTION

Figure 1:
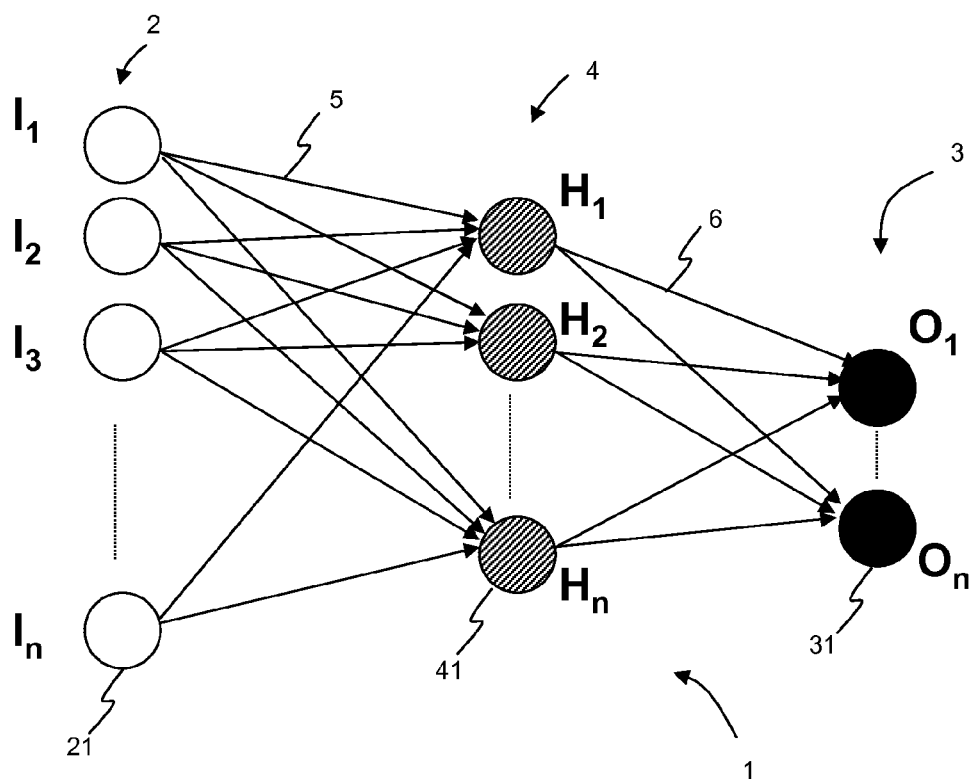
FIG. 1 shows an example of a representative artificial neural network (1) comprising an input layer, an output layer, and a hidden layer)

The following detailed description is merely exemplary in nature and is not intended to limit the various embodiments or the application and uses thereof. Furthermore, there is no intention to be bound by any theory presented in the preceding background or the following detailed description.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "dye" means a colorant or colorants that produce color or colors and is usually soluble in a coating composition.

The term "pigment" or "pigments" used herein refers to a colorant or colorants that produce color or colors and is usually not soluble in a coating composition. A pigment can be from natural and synthetic sources and made of organic or inorganic constituents. A pigment can also include metallic particles or flakes with specific or mixed shapes and dimensions.

The term "effect pigment" or "effect pigments" refers to pigments that produce special effects in a coating. Examples of effect pigments can include, but not limited to, light absorbing pigment, light scattering pigments, light interference pigments, and light reflecting pigments. Metallic flakes, for example aluminum flakes, can be examples of such effect pigments.

The term "gonioapparent flakes", "gonioapparent pigment" or "gonioapparent pigments" refers to pigment or pigments pertaining to change in color, appearance, or a combination thereof with change in illumination angle or viewing angle. Metallic flakes, such as aluminum flakes are examples of gonioapparent pigments. Interference pigments or pearlescent pigments can be further examples of gonioapparent pigments.

"Appearance" used herein refers to (1) the aspect of visual experience by which a coating is viewed or recognized; and (2) perception in which the spectral and geometric aspects of a coating is integrated with its illuminating and viewing environment. In general, appearance includes texture, sparkle, glitter, or other visual effects of a coating. Appearance usually varies with varying viewing angles or varying illumination angles.

The term "sparkle", "sparkles" or "sparkle effect" refers to the visual contrast between the appearance of highlights on particles of gonioapparent pigments and their immediate surroundings. Sparkle can be defined by, for example, ASTM E284-90 and other related standard methods.

The term "database" refers to a collection of related information that can be searched and retrieved. The database can be a searchable electronic numerical or textual document, a searchable PDF document, an Microsoft Excel® spreadsheet, an Microsoft Access® database (both supplied by Microsoft Corporation of Redmond, Wash.), an Oracle® database (supplied by Oracle Corporation of Redwood Shores, Calif.), or a Lynux database, each registered under their respective trademarks. The database can be a set of electronic documents, photographs, images, diagrams, or drawings, residing in a computer readable storage media that can be searched and retrieved. A database can be a single database or a set of related databases or a group of unrelated databases. "Related database" means that there is at least one common information element in the related databases that can be used to relate such databases. One example of the related databases can be Oracle® relational databases. In one example, color characteristics comprising color data values such as L,a,b color values, $L^*,a^*,b^*$ color values, XYZ color values, L,C,h color values, spectral reflectance values, light absorption (K) and scattering (S) values (also known as "K,S values"), or a combination thereof, can be stored and retrieved from one or more databases. Other color values such as CIE LUV color values, $L^*,C^*,H^*$ color values, any other color values known to or developed by those skilled in the art, or a combination thereof, can also be used. In another example, appearance characteristics, sparkle values and related measurements, coating formulations, vehicle data, or a combination thereof, can be stored and retrieved from one or more databases.

The term "vehicle", "automotive", "automobile", "automotive vehicle", or "automobile vehicle" refers to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

A computing device used herein can refer to a data processing chip, a desktop computer, a laptop computer, a pocket PC, a personal digital assistant (PDA), a handheld electronic processing device, a smart phone that combines the functionality of a PDA and a mobile phone, or any other electronic devices that can process information automatically. A computing device can be built into other electronic devices, such as a built-in data processing chip integrated into an imaging device, color measuring device, or an appearance measuring device. A computing device can have one or more wired or wireless connections to a database, to another computing device, or a combination thereof. A computing device can be a client computer that communicates with a host computer in a multi-computer client-host system connected via a wired or wireless network including intranet and internet. A computing device can also be configured to be coupled with a data input or output device via wired or wireless connections. For example, a laptop computer can be operatively configured to receive color data and images through a wireless connection. A "portable computing device" includes a laptop computer, a pocket PC, a personal digital assistant (PDA), a handheld electronic processing device, a mobile phone, a smart phone that combines the functionality of a PDA and a mobile phone, a tablet computer, or any other electronic devices that can process information and data and can be carried by a person.

Wired connections include hardware couplings, splitters, connectors, cables or wires. Wireless connections and devices include, but not limited to, Wi-Fi device, Bluetooth device, wide area network (WAN) wireless device, local area network (LAN) device, infrared communication device, optical data transfer device, radio transmitter and optionally receiver, wireless phone, wireless phone adaptor card, or any other devices that can transmit signals in a wide range of radio frequency including visible or invisible optical wavelengths and electromagnetic wavelengths.

An imaging device can refer to a device that can capture images under a wide range of radio frequency including visible or invisible optical wavelengths and electromagnetic wavelengths. Examples of the imaging device include, but not limited to, a still film optical camera, an X-Ray camera, an infrared camera, a video camera, also collectively known as a low dynamic range (LDR) imaging device or a standard dynamic range (SDR) imaging device, and a high dynamic range (HDR) or wide dynamic range (WDR) imaging device such as those using two or more sensors having varying sensitivities. The HDR and the WDR imaging device can capture images at a greater dynamic range of luminance between the lightest and darkest areas of an image than typical standard imaging devices. A digital imager or digital imaging device refers to an imaging device captures images in digital signals. Examples of the digital imager include, but not limited to, a digital still camera, a digital video camera, a digital scanner, and a charge couple device (CCD) camera. An imaging device can capture images in black and white, gray scale, or various color levels. A digital imager is preferred in this invention. Images captured using a non-digital imaging device, such as a still photograph, can be converted into digital images using a digital scanner and can be also suitable for this invention.

This disclosure is directed to a process for producing one or more predicted target sparkle values of a target coating composition. The target coating composition can comprise one or more effect pigments, herein referred to as target effect pigments. The process can comprise the steps of:

(A) obtaining training data of a plurality of training coatings, said training data comprise measured color characteristics, measured sparkle values and an individual training coating formulation associated with each of the training coatings; and (B) training an artificial neural network with said training data to produce a trained artificial neural network that is capable of producing a predicted sparkle value based on a coating formulation and color characteristics associated with said coating formulation, wherein said trained artificial neural network is trained based on said measured color characteristics, said measured sparkle values and said individual training coating formulation associated with each of the training coatings.

The process can further comprise the step of:

(C) producing the predicted target sparkle values from said trained artificial neural network based on the target coating formulation and target color characteristics associated with said target coating formulation; and (D) outputting said predicted target sparkle values to an output device.

The target coating formulation and said training coating composition can be the same or different.

The output device can be a display devices disclosed herein that can display information or images based on digital signals, such as a high dynamic range (HDR) image display device, a low dynamic range (LDR), or a standard dynamic range (SDR) display device. The output device can also be a printing device that prints, based on digital signals, information or image onto papers, plastics, textiles, or any other surfaces that are suitable for printing the information or images onto. The output device can also be a duel functional display/data input/output device, such as a touch screen. The output device can also be a database device, such as a hard drive, a memory device, an optic disc and reader or writer; one or more databases, such as an Excel spreadsheet database, an Oracle® database under respective registered trademark of Oracle International Corporation, Redwood City, Calif., USA, a windows based database, a Lynux based database, or another databases that can store information in digital forms; or a combination thereof. In another example, the sparkle values can be displayed as numeric value on a display device such as a screen. In yet another example, the predicted target sparkle values can be stored in a database.

The artificial neural network can comprise: an input layer having one or more input nodes for receiving inputs, such as color characteristics and coating formulations; at least one hidden layer having one or more hidden nodes; an output layer having one or more output nodes for producing outputs, such as said predicted sparkle values; individual input connection weights connecting each of the input nodes with the hidden nodes in a first of said hidden layers; individual output connection weights connecting each of the output nodes with each of the hidden nodes in a last of said hidden layers; wherein the first and the last of the hidden layers are the same when there is only one hidden layer and the first and the last of the hidden layers are different when there are two or more hidden layers. Output of a node can be the summation of connection weights of the inputs connected to that node.

The term "first of the hidden layers" or "first hidden layer" refers to a hidden layer closest to the input layer, wherein each of the nodes in the first hidden layer is connected to each of the input nodes by individual input connection weights. The term "last hidden layer" or "the last of the hidden layer" refers to a hidden layer closest to the output layer, wherein each of the nodes in the last hidden layer is connected to each of the output nodes by individual output connection weights. When there is only one hidden layer, the first hidden layer and the last hidden layer can be the same hidden layer and therefore each of the hidden nodes can be connected with each of the input nodes and each of the output nodes.

The artificial neural network can comprise two or more hidden layers. When there are two or more hidden layers in the artificial neural network, each of the hidden nodes in the first hidden layer is connected to each of the input nodes and to each of second layer hidden nodes in a second hidden layer; each of the second hidden nodes in the second hidden layer is connected to each of the nodes in a proceeding layer with a hidden connection weight and to each of nodes in a subsequent hidden layer with a subsequent hidden connection weight; and each of the hidden nodes in the last hidden layer is connected to each of the nodes in the proceeding hidden layer and to each of the output nodes in the output layer.

In one example, the artificial neural network (1) can comprise an input layer (2) having a plurality of input nodes (21), such as $I_1, I_2, \ldots I_n$; an output layer (3) having one or more output nodes (31) such as $O_1$ through $O_n$, etc.; and a hidden layer (4) having one or more hidden nodes (41) such as $H_1, H_2, \ldots H_n$ (FIG. 1). The input nodes and the hidden nodes can be connected with individual input connection weights (5). The output nodes and the hidden nodes can be connected with individual output connection weights (6).

Figure 2:
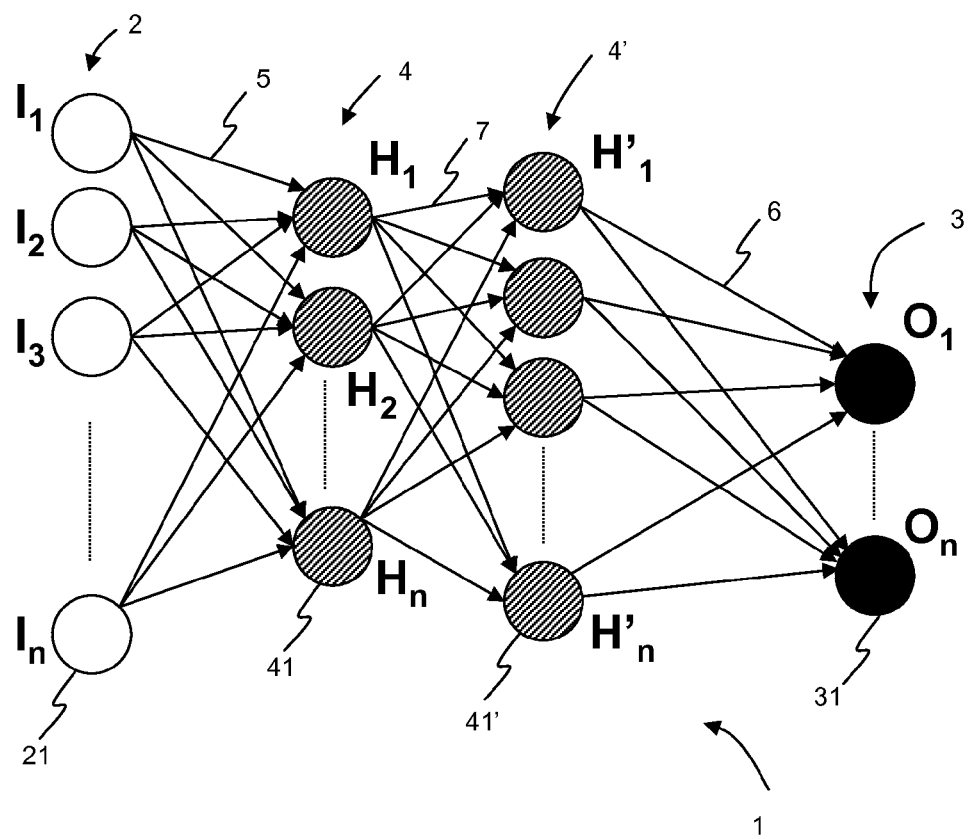
FIG. 2 shows an example of a representative artificial neural network comprising an input layer having a plurality of input nodes, such as $I_1, I_2, \ldots I_n$; an output layer having one or more output nodes such as $O_1$ through $O_n$, etc.; and two hidden layers each having one or more hidden nodes such as $H_1, H_2, \ldots H_n$ and $H'_1, H'_2, \ldots H'_n$.

In another example, the artificial neural network (1) can comprise an input layer (2) having a plurality of input nodes (21), such as $I_1, I_2, \ldots I_n$; an output layer (3) having one or more output nodes (31) such as $O_1$ through $O_n$, etc.; and two hidden layers (4 and 4') each having one or more hidden nodes (41 and 41') such as $H_1, H_2, \ldots H_n$ and $H'_1, H'_2, \ldots H'_n$. Each of the hidden nodes in one hidden layer can be connected to each of the hidden nodes in another hidden layer with individual hidden connection weights (7) (FIG. 2).

The artificial neural network can be configured to have one input node for each of input variables and one output node for each of output values. In one example, each of the ingredients in a coating formulation can have one corresponding input node. In another example, each of the color values can have one corresponding input node. In yet another example, each of sparkle values can have one corresponding output node. In yet another example, there can be one output node for each of the sparkle values at one of the 15°, 45° or 75° illumination angles.

The artificial neural network can be trained into a trained artificial neural network that is capable of producing a predicted sparkle value based on a coating formulation and color characteristics associated with said coating formulation.

The trained artificial neural network can comprise:
a) an input layer having one or more input nodes for receiving color characteristics and coating formulations;
b) at least one hidden layer having one or more hidden nodes;
c) an output layer having one or more output nodes for producing said predicted sparkle values;
d) individual trained input connection weights connecting each of the input nodes with the hidden nodes in a first of said hidden layers;
e) individual trained output connection weights connecting each of the output nodes with each of the hidden nodes in a last of said hidden layers;
wherein said first and the last of the hidden layers are the same when there is only one hidden layer and said first and the last of the hidden layers are different when there are two or more hidden layers.

The trained artificial neural network can comprise one hidden layer in one example, two hidden layers in another example, three hidden layers in yet another example, four hidden layers in yet a further example. Each of the hidden nodes in one hidden layer can be fully connected to each of the hidden nodes in an adjacent hidden layer with trained hidden connection weights, fully connected to each of the input nodes in the input layer if such hidden layer is a first hidden layer that is adjacent to the input layer, or fully connected to each of the output nodes in the output layer if such hidden layer is a last hidden layer that is adjacent to the output layer.

Following is an example of a process that can be used to train the artificial neural network. Other training processes that known to or developed by those skilled in the art can also be used to train the artificial neural network.

Measured color characteristics, measured sparkle values and an individual training coating formulation associated with each of the training coatings can be entered into the artificial neural network. The measured color characteristics and the individual training coating formulation can be entered via the input nodes, wherein each ingredient of the individual training coating formulation and each of the measured color characteristics can have individual corresponding input node. A supervised backpropagation training method can be used in which the measured sparkle values can be used to direct the training of the network connection weights. Initially, a small random value or a previously known value can be assigned to each of the connection weights, such as the input connection weights, the hidden connection weights if present, and the output connection weights, so that the artificial neural network can produce an initial predicted sparkle value based on the measured color characteristics and the individual training coating formulation. The initial predicted sparkle value can be compared to the measured sparkle value. A backpropagation algorithm can be applied to generate one or more modified connection weights in directions that reduce the error between the measured sparkle value and the initial predicted sparkle value. Examples of the backpropagation algorithm can include those described in U.S. Pat. No. 5,046,020. The modified connection weights can be generated, for example, by using the methods described by Owens and Filkin (Efficient training of the back propagation network by solving a system of stiff ordinary differential equations, International Joint Conference on Neural Networks, Washington, D.C., 2, 381-386, June 1989). The process can be iterated until no further reduction in error can be made. A cross-validation method can be employed to split the training data into an initial training data set and a testing data set. The initial training data set can be used in the back propagation training of the network weights. The testing data set can be used to verify that the trained network generalizes to make good predictions based on independent measured color characteristics and coating formulations. The best connection weights can be taken as the trained input connection weights, the trained output connection weights, and optionally the trained hidden connection weights if present, to produce the trained artificial neural network that can best predict the output sparkle values. The number of hidden nodes in a hidden layer and the number of hidden layers in the network can also be optimized using the training data, the testing data, or both the training and the testing data.

The predicted target sparkle values can be produced from the trained artificial neural network by entering the target coating formulation and the target color characteristics associated with the target coating formulation via the input nodes.

The trained artificial neural network can be further trained. In one example, one or more target coatings can be produced from the target coating composition. Measured target sparkle values can be obtained from the target coatings. The measured target sparkle values can be compared to the sparkle values produced from said trained artificial neural network. The connection weights in the trained artificial neural network can be further trained and optimized with the aforementioned training process. While the previous description disclosed the preferred method of using neural networks, one of ordinary skill in the art would understand that other methods could be used. Other methods that could be used include, for example, other linear or non-linear techniques, or a combination thereof that could be used include partial least squares, principal component regression, support vector machines for regression, or radial basis functions.

Color and appearance of a coating can vary in relation to illumination. An example of a standard procedure can include those described in ASTM E-2194. Briefly, when a coating (51) is illuminated by an illumination source (52), such as a light bulb or sun light, at an illumination angle as shown in FIG. 3, a number of viewing angles can be used, such as, 1) near aspecular angles (54), that are the viewing angles from about 15° to about 25° from the specular reflection (53) of the illumination; 2) mid aspecular angles (55), that are the viewing angles about 45° from the specular reflection (53) of the illumination; and 3) far aspecular angles (also known as flop angle) (56), that are the viewing angles from about 75° to about 110° from the specular reflection (53) of the illumination. In general, color appears to be slightly brighter at near aspecular angles and slightly darker at far aspecular angles. The illumination angle is the angle measured from the normal direction shown as Z-Z' (FIGS. 3A and 3B). The color can be viewed by a viewer or a detector (58) at the various viewing angles.

Although specific view angles are specified above and can be preferred, viewing angles can include any viewing angles that are suitable for viewing the coating or detecting reflections of the coating. A viewing angle can be any angles, continuously or discretely, in a range of from 0° from the specular reflection (53) to the surface of the coating (51) on either side of the specular reflection (53) (FIG. 3A), or in a range of from 0° from the specular reflection (53) to the tangent (51a) of the surface of the coating (FIG. 3B). In one example, when the specular reflection (53) is at 45° from the normal (Z-Z'), viewing angles can be any angles in the range of from 0° to −45° from the reflection, or from 0° to 135° from the reflection (FIG. 3A). In another example, when the specular reflection (53) is at 75° from the normal (Z-Z'), viewing angles can be any angles in the range of from 0° to −15° from the specular reflection, or from 0° to 165° from the specular reflection. Depending on the specular reflection (53), the range of viewing angles can be changed and determined by those skilled in the art.

Figure 4:
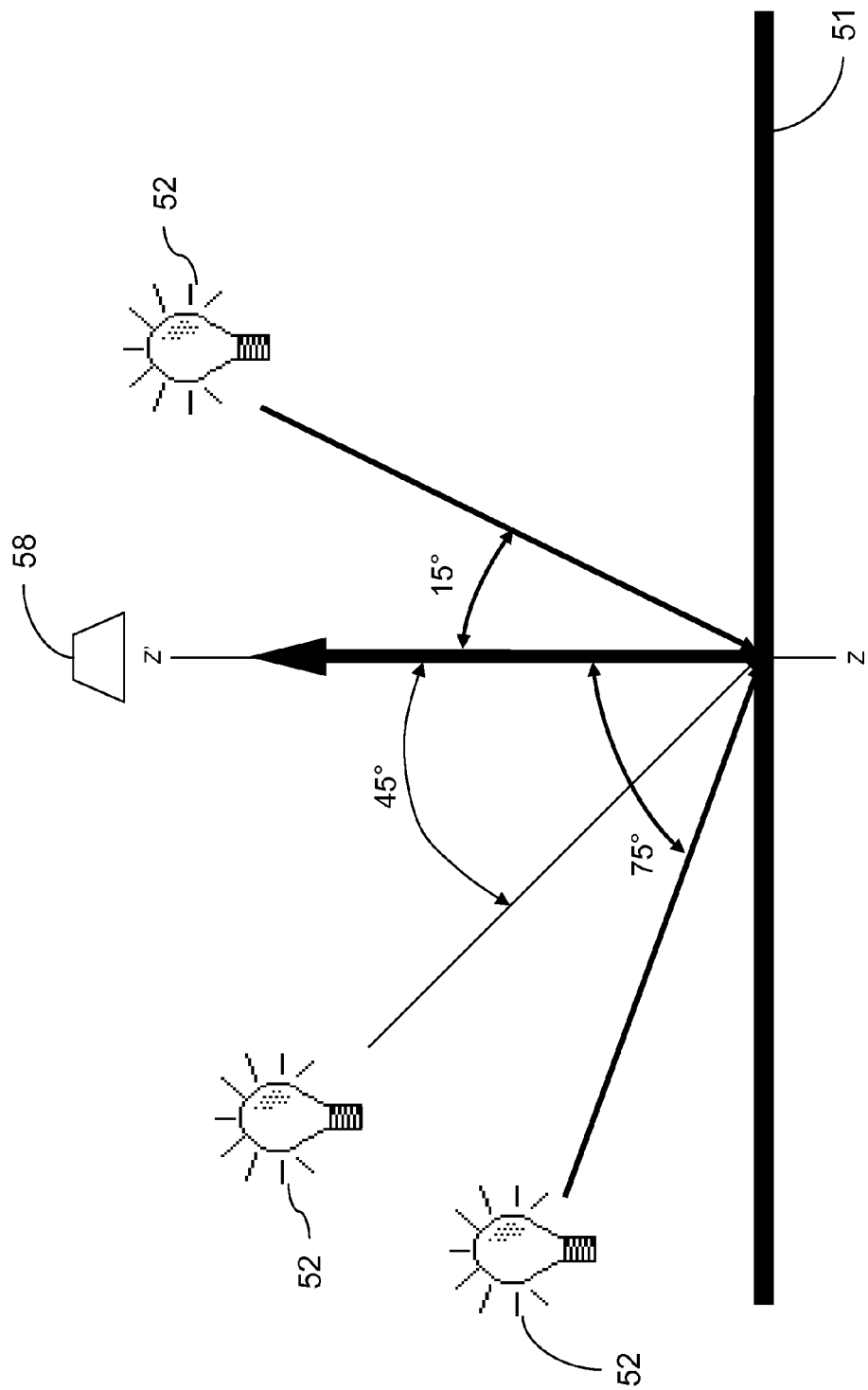
FIG. 4 shows examples of a fixed viewing angle and three illumination angles.

Another configuration is shown in FIG. 4 wherein a detector (58) can be fixed at the normal (Z-Z') facing towards the coating surface (51). One or more illumination sources (52) can be positioned to provide illumination at one or more illumination angles, such as at 15°, 45°, 75°, or a combination thereof, from the normal (Z-Z') (FIG. 4).

The one or more predicted target sparkle values can be produced based on one or more illumination angles, one or more viewing angles, or a combination thereof. In one example, predicted target sparkle values can be produced based on the illumination angles at 15°, 25°, 45°, 75°, or a combination thereof. In another example, predicted target sparkle values can be produced based on one illumination angle selected from 15°, 25°, 45° or 75° and one viewing angle selected from 15°, 25°, 45°, 75°, or 110° aspecular angles. In yet another example, predicted target sparkle values can include values produced based on each of the illumination angles selected from 15°, 25°, 45° or 75° and each of the viewing angles selected from 15°, 25°, 45°, 75°, or 110° aspecular angles. In a further example, one or more predicted target sparkle values can be produced based on a viewing angle of 15°, 25°, 45°, 75°, or a combination thereof, said viewing angle being an aspecular angle.

Although specific illumination angles are specified above and can be preferred, illumination angles can include any angles that are suitable for illuminating the coating. The illumination angle can be any angles, continuously or discretely, in a range of from 0° from the normal (Z-Z') to 90° from the normal (Z-Z') of the surface of the coating (51) (FIG. 3A), or the tangent (51a) of the surface of the coating (FIG. 3B). In one example, the illumination angle can include any angles, continuously or discretely, in a range of from 0° to 90° from the normal (Z-Z') on either side of the normal.

The target coating formulation and the individual training coating composition associated with each of the training coatings can typically comprise a plurality of ingredients, such as one or more binder polymers, pigments or effect pigments, and optionally one or more solvents and one or more coating additives.

The target color characteristics can be selected from: measured target color characteristics obtained by measuring a target coating produced from said target coating composition, retrieved target color characteristics retrieved based on said target coating composition from a color database comprising color characteristics associated with coating compositions, predicted target color characteristics obtained based on said target coating composition from a color predicting computing program product that predicts coating colors based on coating compositions, or a combination thereof. The measured target color characteristics can also be obtained from a coating that is produced from a coating composition identical to the target coating composition with all other ingredients except without the target effect pigment, with different size or amount of the target effect pigment, or with one or more different effect pigments. This can be particularly useful for producing matching coatings that can match a plurality of coatings having same or similar color, but different sparkle values. This can be particularly useful when the effect pigment has little or no effect on the color of the target coating composition.

The measured color characteristics can comprise color data values selected from L,a,b color values, L*,a*,b* color values, XYZ color values, L,C,h color values, spectral reflectance values, light absorption (K) and scattering (S) values (also known as "K,S values"), or a combination thereof. Other color values such as CIE LUV color values, L*,C*,H* color values, any other color values known to or developed by those skilled in the art, or a combination thereof, can also be used. The color data values can be obtained at one or more illumination angles, one or more viewing angles, or a combination thereof. In one example, the color data values can be obtained at a viewing angle of 15°, 25°, 45°, 110°, or a combination thereof, said viewing angle being an aspecular angle and can be measured with a color measuring device. The color measuring device can be a colorimeter, a spectrophotometer, or a goniospectrophotometer. Any suitable colorimeter or spectrophotometer, such as Model SP64 manufactured by X-Rite, Grandville, Mich. can be used. A goniospectrophotometer is also known as multi-angle spectrophotometer. Any suitable Goniospectrophotometers, such as Model MA68II from X-Rite, Grandville, Mich., or the ones provided by Murakami Color Research Laboratory, Tokyo, Japan, or by IsoColor Inc., Carlstadt, N.J., USA, can be used.

The color values can be converted from one form to another using methods known to or developed by those skilled in the art.

In one example, XYZ color values, also known as tristimulus values can be converted from spectral reflectance values using following equations:

$$X = k \int_\lambda S_\lambda R_\lambda \bar{x}_\lambda d\lambda \quad \text{(Equation 1)}$$

$$Y = k \int_\lambda S_\lambda R_\lambda \bar{y}_\lambda d\lambda$$

$$Z = k \int_\lambda S_\lambda R_\lambda \bar{z}_\lambda d\lambda$$

$$k = \frac{100}{\int_\lambda S_\lambda \bar{y}_\lambda d\lambda}$$

where, $S_\lambda$ is a CIE illuminant, $R_\lambda$ is the object's spectral reflectance factor, $\bar{x}_\lambda$, $\bar{y}_\lambda$, and $\bar{z}_\lambda$ are the CIE standard observer color-matching function, $\int$ represents summation across wavelength, k is a normalizing constant, and dλ is the measurement wavelength interval.

In another example, L*,a*,b* color values can be converted from color tristimulus values using following equations:

$$L^* = 116 \left[ f\left(\frac{Y}{Y_n}\right) - \frac{16}{116} \right] \quad \text{(Equation 2)}$$

for $$a^* = 500 \left[ f\left(\frac{X}{X_n}\right) - f\left(\frac{Y}{Y_n}\right) \right]$$

$$b^* = 200 \left[ f\left(\frac{Y}{Y_n}\right) - f\left(\frac{Z}{Z_n}\right) \right]$$

where $f(Y/Y_n)=(Y/Y_n)^{1/3}$ for $Y/Y_n$ greater than 0.008856 and $f(Y/Y_n)=7.787(Y/Y_n)+16/116$ for $Y/Y_n$ less than or equal to 0.008856; $f(X/X_n)$ and $f(Z/Z_n)$ similarly defined.

Sparkle values can be a function of sparkle intensity and sparkle area such as the function defined below:

$$S_G = f(S_i, S_a)$$

wherein, $S_G$, $S_i$ and $S_a$ are sparkle value, sparkling intensity, and sparkling area, respectively. One or more algorithms can be employed to define the function to calculate the $S_G$ from $S_i$ and $S_a$. In one example, sparkle values can be obtained from commercial instruments, such as BYK-mac available from BYK-Gardner USA, Columbia, Md., USA.

The measured sparkle values can be obtained at one or more illumination angles, one or more viewing angles, or a combination thereof.

The measured sparkle values can be obtained at one or more illumination angles. In one example, measured sparkle values can be obtained at 15° illumination angle. In another example, measured sparkle values can be obtained at 45° illumination angle. In yet another example, measured sparkle values can be obtained at 75° illumination angle. In a further example, measured sparkle values can be obtained at a combination of one or more of 15°, 25°, 45°, and 75° illumination angles. The measured sparkle values can be obtained at one or more viewing angles. In one example, the measured sparkle values can be obtained at a viewing angle of 15°, 25°, 45°, 75°, or a combination thereof, said viewing angle being an aspecular angle.

The training coatings or the target coating can be any coatings known to or developed by those skilled in the art, such as solvent borne coatings, waterborne coatings, radiation curable coatings, dual cure coatings, one pack (1K) coatings, or two pack (2K) coatings. The coatings can be applied over any substrate known to or developed by those skilled in the art. The substrate can include, but not limited to, metal, wood, plastic, paper, glass, concrete, polymers, composite materials, or any other natural or man-made materials.

The training coatings or the target coating can have one or more coating layers, such as a primer coating layer, a basecoat coating layer, a topcoat coating layer, a clearcoat coating layer, or a combination thereof. Any of the coatings can have pigments, dyes, effect pigments, or a combination thereof. It is preferred that at least one of the training coatings comprises at least one effect pigment the same or different from said target effect pigment.

Using the predicted target sparkle values produced from the process disclosed herein, the target coating composition can be modified to meet desired specification. For example, a target coating composition can be produced to match color and sparkle of a vehicle's existing coating and can be used to repair one or more damages to that vehicle's coating.

The process can further comprise the steps of:

(E) generating a target image having R,G,B values based on said predicted target sparkle values, said target color characteristics, and optionally a shape of an article coated with the target coating composition; and (F) displaying said target image having said R,G,B values on a display device.

The target image can be displayed based on one or more illumination angles, one or more viewing angles, or a combination thereof. Images representing multiple viewing angles can be referred to as realistic matching images. Methods for generating realistic images of coating color and appearance based on coating formulas and color and appearance characteristics are described in commonly owned U.S. Pat. No. 7,639,255, filed on Oct. 27, 2006, which is incorporated by reference in their entirety. In brief, the images are generated by converting the L,a,b, or L*,a*,b*, values at at least three angles to corresponding XYZ values, calculating a range of aspecular angles required for display, and calculating corresponding R, G, B values from the corresponding XYZ values and the angles for display. The images can also be based on spectral reflectance. The R, G, B values may further be modified or calibrated to fit various display devices. The predicted target sparkle values at one or more angles can be incorporated with the color values and appearance characteristics of the target coating other than the sparkle, such as texture, coarseness, etc., for calculating final R,G,B values to display the target image. For coatings having very strong sparkles, more than one of the target images can be displayed. In one example, one target image can include only the color values and appearance characteristics of the target coating other than the sparkle. In another example, one target image can include the sparkle, the color values and appearance characteristics of the target coating other than the sparkle. In yet another example, the target image can be displayed dynamically based on viewing preference. The target image can be displayed as a high dynamic range (HDR) target image. The target image can be generated using high dynamic range (HDR) rendering. In one example the target image can be generated into a plurality of standard images at various ranges and then merged together to form a HDR target image for better display of details at various ranges. The target image or the HDR target image can be generated using bidirectional reflectance distribution function (BRDF). One example of a method for generating image using BRDF is disclosed in U.S. Patent Publication No. US 2010-0094601, filed on Apr. 24, 2009. In brief, the BRDF can be generated with a BRDF computing program product based on the predicted target sparkle values, the target coating formulation, the target color characteristics and a refractive index associated with the target coating formulation. The BRDF can be particularly useful for generating HDR target images having sparkles that have very high intensity together with color characteristics.

The target image or the HDR target image can also be generated and displayed based on the predicted target sparkle values, the target color characteristics, and a shape of an article coated with the target coating composition. This can be done by generating the images using varying illumination angles, varying viewing angles and a combination thereof, based on the shape of the article. The aforementioned methods for generating realistic images of coating color and appearance, the BRDF, or a combination thereof can be used. The article can be a vehicle or a portion of the vehicle. In one example, the target image or the HDR target image is generated and displayed based on the shape of a vehicle, or a portion thereof. Any of the aforementioned vehicles can be suitable.

The display device can be a computer monitor, a projector, a TV screen, a personal digital assistant (PDA) device, a cell phone, a smart phone that combines PDA and cell phone, an iPod, an iPod/MP Player, a flexible thin film display, a high dynamic range (HDR) image display device, a low dynamic range (LDR), a standard dynamic range (SDR) display device, or any other display devices that can display information or images based on digital signals. The display device can also be a printing device that prints, based on digital signals, information or image onto papers, plastics, textiles, or any other surfaces that are suitable for printing the information or images onto. The display device can also be a multi-functional display/input/output device, such as a touch screen. The HDR target image can be displayed on a HDR image display device, a non-HDR image display device mentioned herein, or a combination thereof. The non-HDR image display device can be any of the display devices such as those standard display devices, or low dynamic range (LDR) or standard dynamic range (SDR) display devices. The HDR image needs to be modified to display on a non-HDR image display device. Since the sparkles can have very high intensity, they can be difficult to display together with color characteristics in a same image. The HDR target image can be used to improve the display of sparkles and colors.

One advantage of the process disclosed herein can be that a matching coating can be produced without laborious and repetitive spray-out, drying and measuring. Another advantage can be that the trained artificial neural network can be improved with increasing number of training coatings. For example, each target coating that is satisfactory in matching color and sparkle of an object can be used as a training coating to improve the artificial neural network.

This disclosure is also directed to a system for producing one or more predicted target sparkle values of a target coating composition. The target coating composition can comprise one or more effect pigments, herein referred to as target effect pigments. The system can comprise:
(i) a computing device;
(ii) an artificial neural network computing program product residing on said computing device or a host computer functionally coupled to said computing device, said artificial neural network computing program product comprises:
a) an input layer having one or more input nodes for receiving inputs;
b) at least one hidden layer having one or more hidden nodes;
c) an output layer having one or more output nodes for producing outputs;
(iii) an input device and an output device functionally coupled to said computing device; and
(iv) a computer program product comprising computing codes functionally coupled to said computing device for performing a computing process, said computing process comprises the steps of:
(1) receiving training data of a plurality of training coatings into said one or more input nodes of said artificial neural network computing program product, said training data comprise measured color characteristics, measured sparkle values and an individual training coating formulation associated with each of the training coatings, and
(2) training said artificial neural network computing program product with said training data to produce a trained artificial neural network that is capable of producing a predicted sparkle value from said output nodes based on a coating formulation and color characteristics associated with said coating formulation, wherein said trained artificial neural network is trained based on said measured color characteristics, said measured sparkle values and said individual training coating formulation associated with each of the training coatings.

The computer program product can be functionally coupled to the computing device by residing in or accessible from the computing device. In one example, the computer program product can be installed in the computing device. In another example, the computer program product can be installed in another computer or a host computer and accessible from the computing device.

The trained artificial neural network can comprise individual trained input connection weights connecting each of the input nodes with each of the hidden nodes in a first of said hidden layers; individual trained output connection weights connecting each of the output nodes with each of the hidden nodes in a last of said hidden layers; and wherein said first and the last of the hidden layers are the same when there is only one hidden layer and said first and the last of the hidden layers are different when there are two or more hidden layers.

Any of the aforementioned computing devices or a combination thereof can be suitable for the system. In one example, the artificial neural network computing program product can be residing on the computing device. In another example, the artificial neural network can be residing on a host computer functionally coupled to the computing device via wired or wireless connections.

The input device can be selected from a digital input device, such as a wired keyboard, a wireless keyboard, a digital writing pad, a touch screen, an input portal that can be connected to a electrical device or another computer, or any other digital devices that can input data into the computing device; an optical input device, such as a barcode reader, a scanner, a digital camera, a digital video camera, or any other optical devices that can input data into the computing device; an electromagnetic input device, such as a radio receiver, an RFID (radio frequency identification) receiver, an infrared data receiver, or any other devices that can receive data through a broad range of electromagnetic wavelengths; or a combination thereof. Each of the input devices can further require necessary adaptors or couplings in order to input data into the computing device, wherein those adaptors or couplings can be readily determined by those skilled in the art. Those adaptors or couplings can further be wired or wireless.

The computer program product can be residing on the computing device or a host computer functionally coupled to the computing device via wired or wireless connections. The computer program product can comprise one or more related sub-programs, unrelated sub-programs, or a combination thereof. The one or more related sub-programs or unrelated sub-programs can run in sequential order, in parallel, or a combination thereof. The one or more related sub-programs or unrelated sub-programs can run automatically upon execution in sequential order or in parallel, manually started or stopped in sequential order or in parallel, or a combination thereof. In one example, the training data can be received into an Excel spreadsheet and then exported into the artificial neural network. In another example, some or all of the training data can be received into a sub-program to convert into a desired format and then exported into the artificial neural network. In yet another example, one or more training coating formulations can be processed by a sub-program to extract individual ingredients and then export the individual ingredients into individual input nodes of the artificial neural network. In a further example, color reflection values of a training coating can be received by a sub-program, converted into L*,a*,b* color values, and then exported into the artificial neural network. In yet further an example, a sub-program can be used to retrieve color data values of one or more training coatings from a database and then input into the artificial neural network.

The computing process can further comprise the steps of:
(3) receiving the target coating formulation and target color characteristics associated with said target coating formulation into said trained artificial neural network; and
(4) producing the target sparkle value from said trained artificial neural network based on said target coating formulation and said target color characteristics associated with said target coating formulation; and
(5) outputting said target sparkle value to said output device.

Any of the aforementioned output devices or a combination thereof can be suitable for the system.

The target coating formulation and the target color characteristics associated with said target coating can be received into the trained artificial neural network from the input device, from a target database functionally coupled to the computing device, or a combination thereof.

The training data can be received into the artificial neural network from the input device, from a training database functionally coupled to the computing device, or a combination thereof.

The system can further comprise a display device. Any of the aforementioned display devices or a combination thereof, can be suitable. The display device can be the same or different from the output device. In one example, the display device can be the same as the output device, such as a computer screen. In another example, the output device can be a database, a second computing device, a host computer, a memory device, or a combination thereof. In yet another example, the output device and the display device can be the same or different computers' screens. The display device can be a high dynamic range (HDR) image display device. The system can further comprise a high dynamic range (HDR) or wide dynamic range (WDR) imaging device. The imaging device can be useful for obtaining coating images for generating appearance data of coatings.

The computing process of the system can further comprise the steps of:

(6) generating a target image having R,G,B values based on said predicted target sparkle values, said target color characteristics, and optionally, a shape of an article coated with the target coating composition; and (7) displaying said target image having said R,G,B values on said display device.

The system can further comprise a BRDF computing program product functionally coupled to the computing device for producing a bidirectional reflectance distribution function (BRDF) based on said predicted target sparkle values, said target coating formulation, said target color characteristics associated with said target coating formulation, and a refractive index associated with said target coating formulation. The BRDF computing program product can reside in or accessible from the computing device. In one example, the BRDF computing program product can be installed in the computing device. In another example, the BRDF computing program product can be installed in another computer or a host computer and accessible from the computing device.

The target image can be displayed based on one or more illumination angles, one or more viewing angles, or a combination thereof. The target image can be generated as a HDR target image and displayed on a HDR display device. The HDR target image can also be modified to display on any of the aforementioned non-HDR image display devices.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Characterization of the Trained Neural Network

A training data set containing 3331 data points from a plurality of training coatings was used to train the artificial neural network (ANN) to produce an intermediate artificial neural network for predicting sparkle values at 15° illumination angle based on color characteristics and formulations of coatings.

Figure 5A:
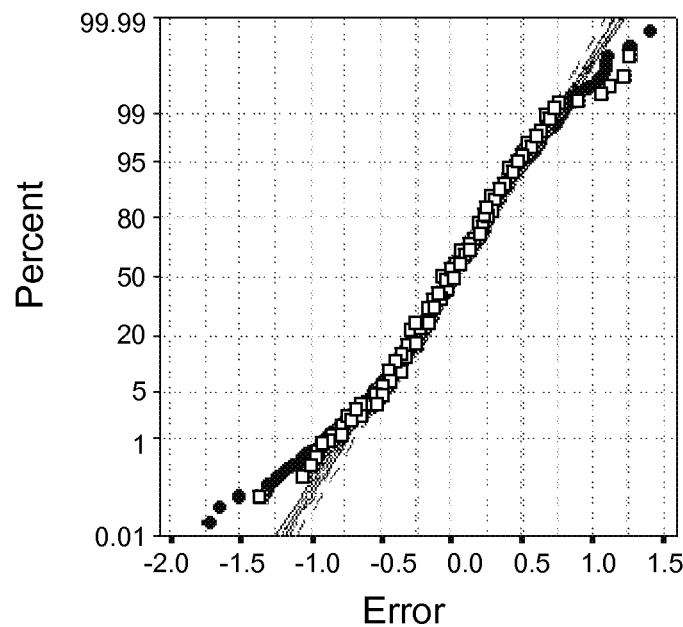
FIGS. 5A and 5B show examples of correlation of measured and predicted sparkle values at 15° viewing angle. In particular.
Figure 5B:
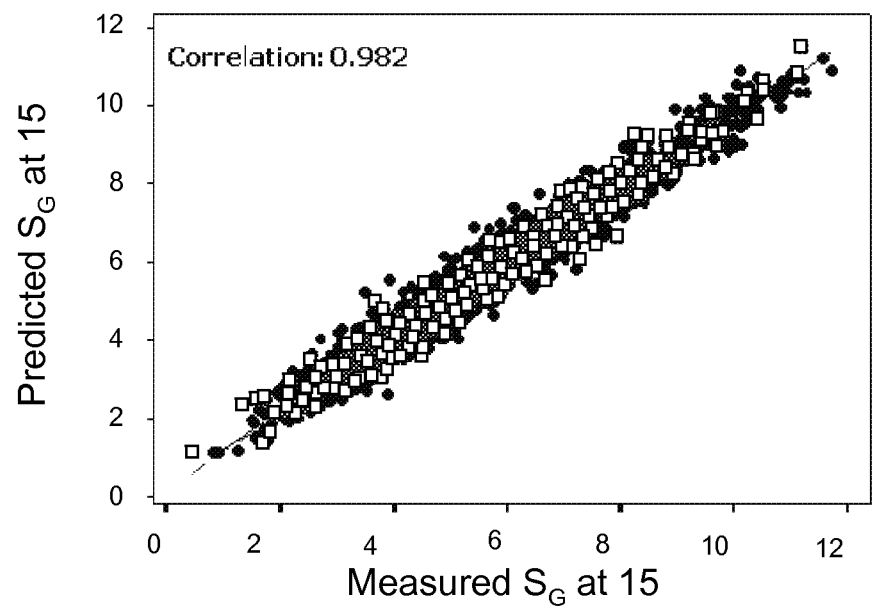

A second set of training data containing 824 data points was used to test the trained artificial neural network. Briefly, color data values and coating formulations of this second training data set were entered into the intermediate artificial neural network. Predicted test sparkle values at 15° illumination angle were produced by the intermediate artificial neural network. The predicted test sparkle values were then compared to the measured sparkle values at 15° illumination angle contained in the second set of the training data. Probability plot of error and correlations between the predicted test sparkle values (open square) and the measured sparkle values (training data) (solid circle) are shown in FIG. 5A and FIG. 5B, respectively.

A training data set containing 3321 data points from a plurality of training coatings was used to train the artificial neural network (ANN) to produce an intermediate artificial neural network for predicting sparkle values at 45° illumination angle based on color characteristics and formulations of coatings.

Figure 6A:
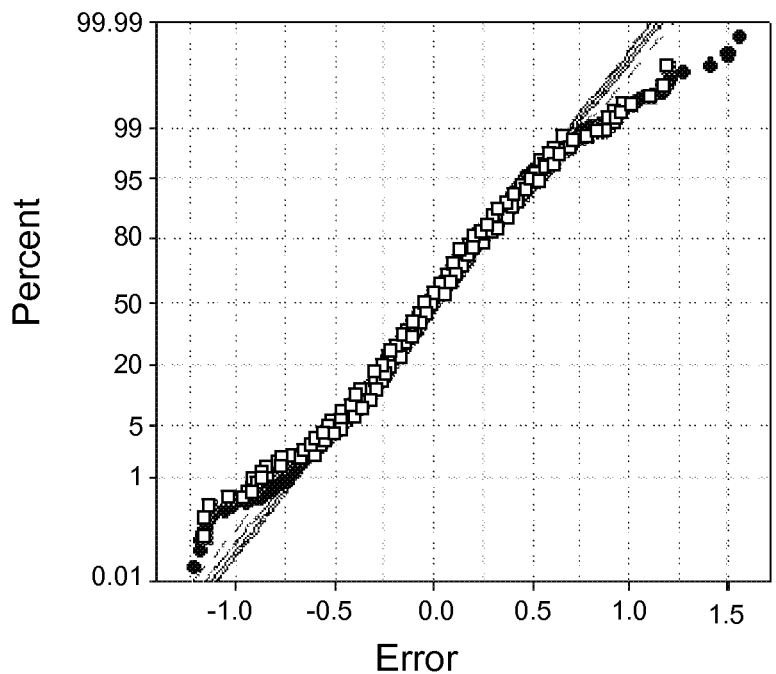
FIGS. 6A and 6B show examples of correlation of measured and predicted sparkle values at 45° viewing angle. In particular.
Figure 6B:
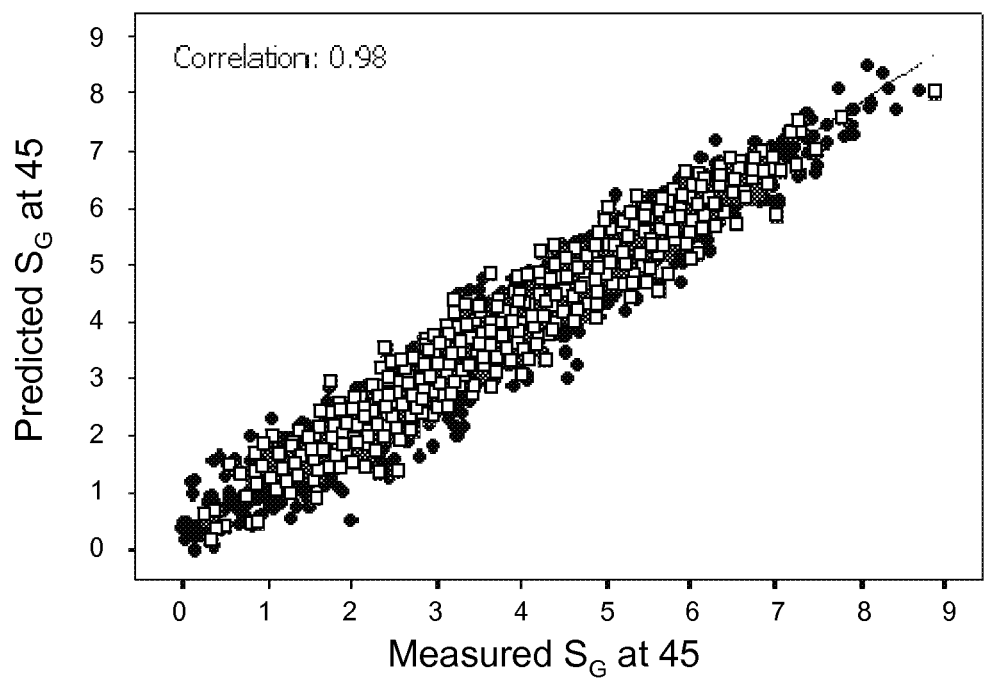

A second set of training data containing 809 data points was used to test the trained artificial neural network. Briefly, color data values and coating formulations of this second training data set were entered into the intermediate artificial neural network. Predicted test sparkle values at 45° illumination angle were produced. The predicted test sparkle values were then compared to the measured sparkle values at 45° illumination angle contained in the second set of the training data. Probability plot of error and correlations between the predicted test sparkle values (open square) and the measured sparkle values (training data) (solid circle) are shown in FIG. 6A and FIG. 6B, respectively.

Connection weights connecting the notes, the number of hidden notes and the number of hidden layers were adjusted if necessary to produce a trained artificial neural network (trained ANN).

Example 1

Each of the ingredients of a coating formulation of Coating Example 1 (Table 1) was entered into a trained artificial neural network installed that has been installed on a laptop computer.

TABLE 1

Formulation of Coating Example 1.

| Ingredients | Concentration (Weight %) |
|---|---|
| Coating Binder I[1] | 25.06 |
| Coating Binder II[2] | 16.73 |
| Violet pigment[3] | 0.31 |
| Blue pigment[4] | 16.94 |
| Aluminum Fake[5] | 23.58 |
| Blue[6] | 12.05 |
| White[7] | 2.65 |
| Additive[8] | 2.68 |
| Total | 100.00 |

Note:
[1-8]The coating binders and pigments are available from E.I. DuPont de Nemours and Company, Wilmington, DE, USA.

Color characteristics of the Coating Example 1 were measured using a color measuring device X-Rite MA68II Portable Multi-Angle Spectrophotometer, available from X-Rite, Grand Rapids, Mich. 49512, USA. The measured color values (Table 2) comprising L*,a*,b* values were entered as inputs into the trained artificial neural network on the same laptop computer. The color values were measured at the viewing angles (aspecular angles) specified in Table 2.

TABLE 2

Measured color values of Coating Example 1.

| Color Value | Aspecular Angle (Viewing/Detection Angle) | | |
| --- | --- | --- | --- |
| | 15° | 45° | 110° |
| L* | 75.68 | 28.80 | 15.51 |
| a* | −41.56 | −13.56 | −0.64 |
| b* | −40.15 | −30.07 | −29.28 |

Sparkle values $S_G$ of the coating were produced using the trained artificial neural network (Predicted $S_G$) at two illumination angles. Measured sparkle values (Measured $S_G$) of the same coating were also obtained by using sparkle measuring device BYK-mac, available from BYK-Gardner USA, Maryland, USA (Table 3). Difference between the predicted and the measured sparkle values are also presented in Table 3.

TABLE 3

Sparkle values.

| Illumination Angle | Measured $S_G$ | Predicted $S_G$ | Error |
| --- | --- | --- | --- |
| 15° | 7.04 | 7.15 | −0.11 |
| 45° | 5.28 | 4.92 | 0.36 |

The invention claimed is:

1. A system for producing one or more predicted target sparkle values of a target coating composition, said system comprising:
   (i) a computing device;
   (ii) an artificial neural network computing program product residing on said computing device or a host computer functionally coupled to said computing device, said artificial neural network computing program product comprising:
      a) an input layer having one or more input nodes for receiving inputs;
      b) at least one hidden layer having one or more hidden nodes;
      c) an output layer having one or more output nodes for producing outputs;
   (iii) an input device and an output device functionally coupled to said computing device; and
   (iv) a computer program product comprising computing codes functionally coupled to said computing device for performing a computing process, said computing process comprising the steps of:
      (1) receiving training data of a plurality of training coatings into said one or more input nodes of said artificial neural network computing program product, said training data comprising measured color characteristics, measured sparkle values and an individual training coating formulation associated with each of the training coatings, and
      (2) training said artificial neural network computing program product with said training data to produce a trained artificial neural network that is capable of producing a predicted sparkle value from said output nodes based on a coating formulation and color characteristics associated with said coating formulation, wherein said trained artificial neural network is trained based on said measured color characteristics, said measured sparkle values and said individual training coating formulation associated with each of the training coatings;
   wherein a sparkle value is a measure of a visual contrast between an appearance of a highlight on a particle of a gonioapparent pigment and an area adjacent to said pigment particle.

2. The system of claim 1, wherein said trained artificial neural network comprises individual trained input connection weights connecting each of the input nodes with each of the hidden nodes in a first of said hidden layers; individual trained output connection weights connecting each of the output nodes with each of the hidden nodes in a last of said hidden layers; and wherein said first and the last of the hidden layers are the same when there is only one hidden layer and said first and the last of the hidden layers are different when there are two or more hidden layers.

3. The system of claim 1, wherein said computing process further comprises the steps of:
   (3) receiving the target coating formulation and target color characteristics associated with said target coating formulation into said trained artificial neural network; and
   (4) producing the target sparkle value from said trained artificial neural network based on said target coating formulation and said target color characteristics associated with said target coating formulation; and
   (5) outputting said target sparkle value to said output device.

4. The system of claim 3, wherein target coating formulation and said target color characteristics associated with said target coating are received into said trained artificial neural network from said input device, from a target database functionally coupled to said computing device, or a combination thereof.

5. The system of claim 3 further comprising a display device selected from a high dynamic range (HDR) image display device, a non-HDR image display device, or a combination thereof.

6. A system for producing one or more predicted target sparkle values of a target coating composition, said system comprising:
   (i) a computing device;
   (ii) an artificial neural network computing program product residing on said computing device or a host computer functionally coupled to said computing device, said artificial neural network computing program product comprising:
      a) an input layer having one or more input nodes for receiving inputs;
      b) at least one hidden layer having one or more hidden nodes;
      c) an output layer having one or more output nodes for producing outputs;
   (iii) an input device and an output device functionally coupled to said computing device; and
   (iv) a computer program product comprising computing codes functionally coupled to said computing device for performing a computing process, said computing process comprising the steps of:
      (1) receiving training data of a plurality of training coatings into said one or more input nodes of said artificial neural network computing program product, said training data comprising measured color characteristics, measured sparkle values and an individual training coating formulation associated with each of the training coatings, (2) training said artificial neural network computing program product with said training data to produce a trained artificial neural network that is capable of producing a predicted sparkle value from said output nodes based on a coating formulation and color characteristics associated with said coating formulation, wherein said trained artificial neural network is trained based on said measured color characteristics, said measured sparkle values and said individual training coating formulation associated with each of the training coatings, (3) receiving the target coating formulation and target color characteristics associated with said target coating formulation into said trained artificial neural network, (4) producing the target sparkle value from said trained artificial neural network based on said target coating formulation and said target color characteristics associated with said target coating formulation, (5) outputting said target sparkle value to said output device, (6) generating a target image having R,G,B values based on said predicted target sparkle values, said target color characteristics, and optionally, a shape of an article coated with the target coating composition; and (7) displaying said target image having said R,G,B values on said display device; and (iv) a display device selected from a high dynamic range (HDR) image display device, a non-HDR image display device, or a combination thereof.

7. The system of claim 6 further comprising a BRDF computing program product functionally coupled to said computing device for producing a bidirectional reflectance distribution function (BRDF) based on said predicted target sparkle values, said target coating formulation, said target color characteristics associated with said target coating formulation, and a refractive index associated with said target coating formulation.

8. The system of claim 7, wherein said target image is generated as a HDR target image.

9. The system of claim 8, wherein said HDR target image is displayed on said HDR image display device, said non-HDR image display device, or a combination thereof.

10. The system of claim 6, wherein said target image is displayed based on one or more illumination angles, one or more viewing angles, or a combination thereof.

11. The system of claim 1, wherein said training data are received into said artificial neural network from said input device, from a training database functionally coupled to said computing device, or a combination thereof.

12. The system of claim 1 further comprising a high dynamic range (HDR) or wide dynamic range (WDR) imaging device.

* * * * *